United States Patent
Tortora (10) Patent No.: US 9,588,493 B2
(45) Date of Patent: Mar. 7, 2017

(54) SET OF LUMINOUS DISPLAY HANDS FOR A PORTABLE OBJECT SUCH AS A WATCH OR A MEASURING INSTRUMENT

(71) Applicant: The Swatch Group Research and Development Ltd, Marin (CH)

(72) Inventor: Pierpasquale Tortora, Neuchatel (CH)

(73) Assignee: The Swatch Group Research and Development Ltd., Marin (CH)

( * ) Notice: Subject to any disclaimer, the term of this patent is extended or adjusted under 35 U.S.C. 154(b) by 0 days.

(21) Appl. No.: 14/717,392

(22) Filed: May 20, 2015

(65) Prior Publication Data

US 2015/0346688 A1    Dec. 3, 2015

(30) Foreign Application Priority Data

May 27, 2014 (EP) .................................. 14170035

(51) Int. Cl.
    *G04B 19/04*    (2006.01)
    *G04B 19/30*    (2006.01)
    *F21V 8/00*     (2006.01)

(52) U.S. Cl.
    CPC ......... *G04B 19/042* (2013.01); *G04B 19/305* (2013.01); *G02B 6/0083* (2013.01)

(58) Field of Classification Search
    CPC ........ G04B 19/04; G04B 19/32; G04B 19/30; G04B 19/305; G04B 19/042; G01D 13/26; G04C 17/00; G02B 6/009; G02B 6/0083
    See application file for complete search history.

(56) References Cited

U.S. PATENT DOCUMENTS

| 2,212,359 | A | * | 8/1940 | Wilcox | ............... G04B 19/305 368/239 |
| 2,363,763 | A | | 11/1944 | Werts | |
| 2,655,783 | A | * | 10/1953 | Uschkamp | ........... G04B 19/305 368/226 |

(Continued)

FOREIGN PATENT DOCUMENTS

| GB | 2 233 478 A | 1/1991 |
| GB | 2 421 809 A | 7/2006 |
| WO | WO 97/28424 A1 | 8/1997 |

OTHER PUBLICATIONS

European Search Report issued Mar. 2, 2015 in European Application 14170035.1, filed on May 27, 2014 (with English translation).

*Primary Examiner* — Sean Kayes
(74) *Attorney, Agent, or Firm* — Oblon, McClelland, Maier & Neustadt, L.L.P.

(57) ABSTRACT

A set of luminous display hands is for a portable object including a frame housing an electrical energy supply source that includes a first and a second terminal. The set includes at least first and second luminous display hands made of an electrically non-conductive material. A drive arbor of the second display hand is arranged concentrically inside a drive arbor of the first display hand. Each of the first and second display hands carries a first, respectively a second light source which emits light. The first and second light sources each include a first and a second pole. Depending on whether the light sources are mounted in parallel or in series, the first pole or the second pole of the second light source is connected to the first pole of the first light source by contact between the first and second hands.

18 Claims, 7 Drawing Sheets

(56) References Cited

U.S. PATENT DOCUMENTS

| | | | | |
|---|---|---|---|---|
| 3,079,748 A | * | 3/1963 | Hultquist | G04B 19/30 368/226 |
| 4,993,005 A | | 2/1991 | Watanabe | |
| 4,995,022 A | * | 2/1991 | Ikeda | G01D 13/26 368/226 |
| 5,025,429 A | * | 6/1991 | Watanabe | G04C 3/14 368/204 |
| 5,623,456 A | * | 4/1997 | Miyamoto | G04B 19/305 368/226 |
| 5,697,322 A | | 12/1997 | Hay et al. | |
| 5,751,662 A | * | 5/1998 | Shaw | G04C 17/02 368/227 |
| 5,797,345 A | * | 8/1998 | Evans, II | G01D 11/28 116/286 |
| 7,172,302 B1 | * | 2/2007 | Dittus | G01D 11/28 116/288 |
| 2006/0028921 A1 | * | 2/2006 | Wang | G04B 19/305 368/238 |
| 2009/0086582 A1 | * | 4/2009 | Olmes | G04B 19/305 368/67 |
| 2011/0280110 A1 | * | 11/2011 | Chen | G04B 19/30 368/67 |
| 2012/0281388 A1 | * | 11/2012 | Cai | F21K 9/135 362/84 |
| 2013/0083508 A1 | * | 4/2013 | Murata | G04B 19/30 362/23.16 |

* cited by examiner

SET OF LUMINOUS DISPLAY HANDS FOR A PORTABLE OBJECT SUCH AS A WATCH OR A MEASURING INSTRUMENT

This application claims priority from European Patent Application No. 14170035.1 filed on May 27, 2014, the entire disclosure of which is hereby incorporated herein by reference.

FIELD OF THE INVENTION

The present invention concerns a set of luminous display hands for a portable object. The present invention concerns, in particular, a set of luminous display hands for a timepiece such as a wristwatch or a measuring apparatus with an analogue display.

BACKGROUND OF THE INVENTION

Watch hands are manufactured with tight tolerances. The hole in the hand for the passage of the pipe is generally made with a precision of around a micrometer. This precision is necessary in order to ensure that the hand is correctly driven onto its arbor. Hands are generally made from a metal sheet with a thickness of no more than a few hundred micrometers. To reduce the thickness of the watch, the distance between the hands and the watch glass are usually no more than a millimeter, whereas the distance which separates two coaxial hands, for example the hour hand and the minute hand, is on the order of a fraction of a millimeter.

Watch hands evidently have a functional role, for example indicating the current time, but they also have a decorative role by greatly contributing to the aesthetic appearance of the watch to which they are fitted. To this end, the hands must meet strict criteria. A well known technique in the world of watchmaking permitting the hands to be seen in the dark consists in coating the surface of the hands oriented towards the user with a layer of phosphorescent material. One example of such a material is a non-radioactive photoluminescent pigment sold by the Japanese company Nemoto & Co. Ltd, under the registered trademark Super-Luminova®. This pigment may also be used to coat the hour symbols on the watch dial. In daytime, the layer of phosphorescent material absorbs light energy. This light energy is then released at night by the layer of phosphorescent material in the form of luminous radiation. This technique of illuminating the hands of a watch is quite convenient insofar as the layer of phosphorescent material operates in a completely passive manner and therefore does not require actuation of any mechanical or electrical device in order to function, nor does it require any energy to be taken from the watch. However, this technique of illuminating the hands of a watch also has some drawbacks, the first of which requiring mention is the fact that the layer of phosphorescent material must be pre-illuminated by a light source before it is able to transmit light energy. Likewise, the phenomenon of retransmitting light by phosphorescence is limited in time, so that the luminosity of the phosphorescent layer decreases gradually as it releases the light energy that it has stored. The appearance of the hands coated with a layer of phosphorescent material is not, therefore, constant. Finally, there is a limited range of phosphorescent materials available on the market, so that most watches in which such materials are used generally have the same appearance in the dark and even in broad daylight.

As a variant of the phosphorescent layer, it is possible to envisage using active illumination techniques in which discrete light sources are used to light the hands of a watch. By way of example, it is possible to integrate an ultraviolet light source in the watch, so that the radiation emitted excites the fluorescent material which coats the hands. However, this type of embodiment also has drawbacks. On the one hand, ultraviolet light sources, also known as black light sources, emit a certain amount of visible light, so that the user is likely to see a halo of light at the place where the light source is placed. On the other hand, given that the hands can move in relation to the ultraviolet light source, they do not always receive the same quantity of ultraviolet light, so that their luminosity may vary.

SUMMARY OF THE INVENTION

It is an object of the present invention to overcome the aforementioned drawbacks in addition to others, by providing a set of luminous display hands able to be illuminated on demand by the user, in a large variety of colours and observing the dimensional and aesthetic constraints to which such hands are subjected.

To this end, the present invention concerns a set of luminous display hands for a portable object, the portable object including a frame which houses an electrical energy supply source, the set of luminous display hands including at least a first and a second luminous display hand made of an electrically non-conductive material and in which a hole is arranged for the passage of a drive arbor, the drive arbor of the second hand being arranged concentrically inside the drive arbor of the first hand with the insertion of an insulating layer between the two drive arbors, each of the first and second hands carrying a first, respectively a second light source which emits light, the first and second light sources each including a first and a second pole, wherein the first pole of the second light source is connected to the first pole of the first light source by contact between the first and second luminous hands.

As a result of these features, the present invention provides a set of concentrically mounted hands which each have a light source for their illumination. This remarkable result is achieved as a result of the fact that one of the poles of one of the light sources is connected to one of the poles of the other light source by means of the electrical contact between the two hands, which enables the drive arbors of the two hands to be used for the electrical connection of the light sources to the terminals of the power supply source. Further, because the hands are used for routing the electrical signal, there is obtained an extremely simple assembly, which is thus less expensive and more reliable.

According to a complementary feature of the invention, the first pole of the second light source is connected to the first pole of the first light source by friction contact between the first and second luminous hands.

According to another feature of the invention, the first luminous display hand includes a light guide provided with an annular element in which is made the hole for the passage of the drive arbor of the first luminous display hand, and the second luminous display hand includes a light guide provided with an annular element in which is made the hole for the passage of the drive arbor of the second luminous hand, the contact between the first and the second luminous hands occurring by friction between the two annular elements.

Because the electrical contact between the two luminous display hands occurs by friction between the two annular elements, the electrical contact between the two hands is never broken regardless of the relative position of the two hands.

According to yet another feature of the invention, the second pole of the second light source is connected to the frame of the portable object via the drive arbor of the second luminous hand.

BRIEF DESCRIPTION OF THE DRAWINGS

Other features and advantages of the present invention will appear more clearly upon reading the following detailed description of one embodiment of the invention, this example being given purely by way of non-limiting illustration with reference to the annexed drawing, in which.

DETAILED DESCRIPTION OF ONE EMBODIMENT OF THE INVENTION

The present invention proceeds from the general inventive idea which consists in illuminating a set of luminous display hands for a portable object, such as a wristwatch or a measuring instrument, by means of a point light source, preferably a light emitting diode. Such a set of luminous display hands has several advantages: its appearance does not deteriorate with the passing of time, and because there is a wide range of existing light emitting diodes, it is possible to personalise the appearance of the hands and therefore the appearance of the portable object to which they are fitted, making it possible to stand out from the competition. Further, according to another advantage of the invention, the light source is housed in the light guide and not, for example, in the drive arbor of the hands, which considerably simplifies the design of such hands as well as the electrical connection thereof to the electrical energy source housed within the frame of the portable object.

Figure 1:
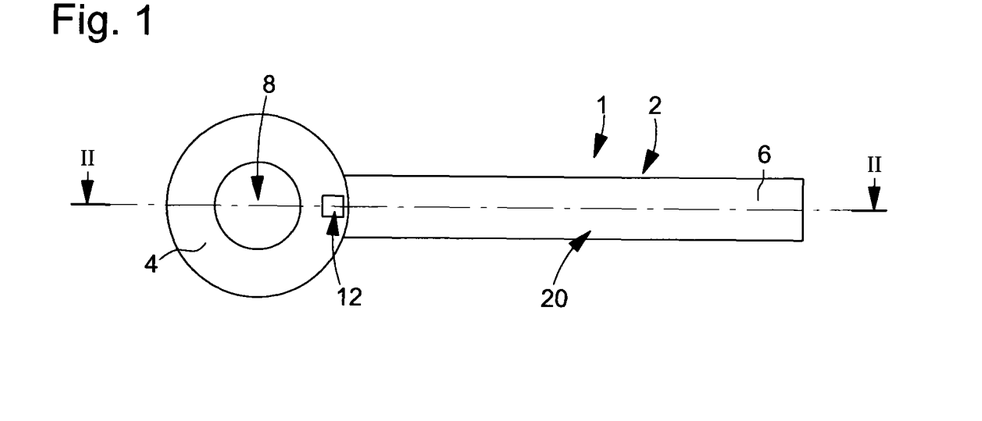
FIG. 1 is a top view of a luminous display hand.
Figure 2:
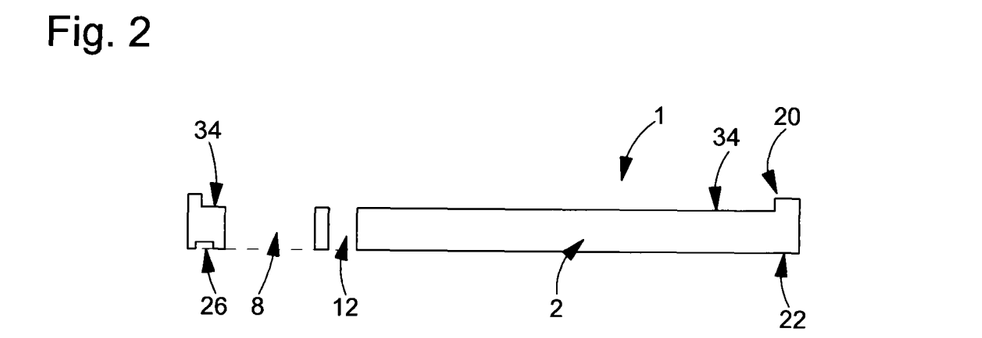
FIG. 2 is a cross-section along the line II-II of FIG. 1 of a luminous display hand.

FIGS. 1 and 2 are respectively a top view and a cross-section along the line II-II of FIG. 1 of a luminous display hand 1. Luminous display hand 1 includes a light guide designated as a whole by the general reference numeral 2 and which may be made, as desired, of a transparent, semi-transparent or translucent material such as plastic, quartz, silicon, sapphire, ruby or other material. Light guide 2 includes an annular element 4 extended by a substantially rectilinear portion 6. Annular element 4 has, at the centre thereof, a hole 8 for the passage of a drive arbor 10. A housing 12 intended to accommodate a light source 14, such as a light emitting diode, is arranged in annular part 4 of light guide 2, in the area where annular part 4 is extended by rectilinear portion 6. Consequently, light source 14 is capable of injecting light by coupling inside light guide 2, and in particular in rectilinear portion 6 of light guide 2. As explained in more detail below, light source 14 includes (see FIG. 3) first and second poles 14A and 14B for electrical connection to an electrical energy supply source 16 housed inside a frame 18, for example of a wristwatch fitted with the luminous display hand. The electrical energy supply source 16 may be either a cell or a rechargeable battery. Given that the light sources in question here typically have an electrical power consumption on the order of several tens to several hundred microamperes, it is even possible to envisage powering said source by means of a watch barrel or a generator or a dynamo actuated by the user, for example by means of a push button, provided in the portable object. The advantage of such a solution lies in the fact that it avoids any energy storage solution relying on physiochemical phenomena. It will also be understood that, even when using light sources whose power consumption is as low as several tens of microamperes, the lighting obtained is already equivalent to that of the phosphorescent materials usually used to coat luminous display hands.

As seen in FIGS. 1 and 2, light guide 2 has a cross-section of square or rectangular shape with a first surface portion 20 facing a user, and a second surface portion 22 opposite the first surface portion 20. In the example shown in the drawing, the first and second surface portions 20 and 22 are flat. It goes without saying, however, that these surface portions 20 and 22 may be other than flat and may be, for example, at least partially curved or structured to produce the desired optical effects. The thickness of the light guide 2 considered between the first and second surface portions 20 and 22, is typically comprised between 200 and 300 micrometers.

Figure 3:
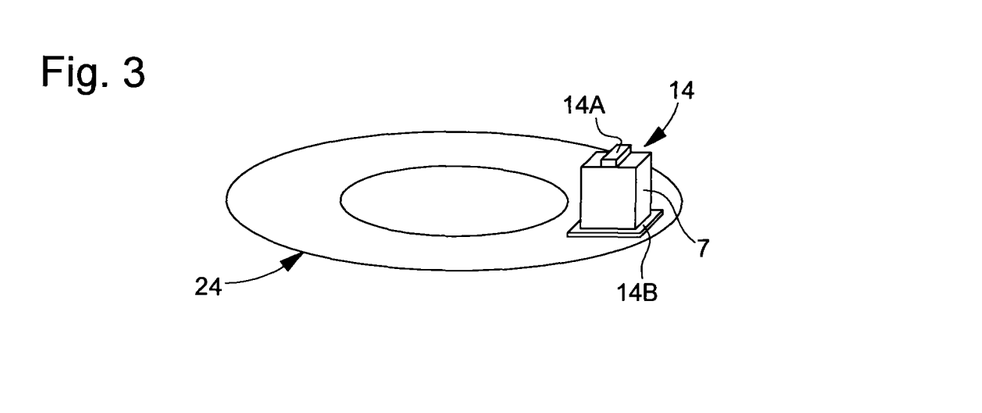
FIG. 3 is a perspective view of an electrically conductive support piece which carries the light source.

FIG. 3 is a perspective view of an electrically conductive support piece 24 which carries the light source 14. This support piece 24 has shape of a ring whose inner diameter does not encroach on hole 8 arranged in annular element 4 of light guide 2 and whose outer diameter is less than the outer diameter of annular element 4 of light guide 2. To facilitate the securing, for example by adhesive bonding, of support piece 24, a circular groove 26, in which support piece 24 is housed, may be arranged in the base of annular element 4. It will be understood that the positioning of light source 14 on support piece 24 is such that, when support piece 24 is fixed to light guide 2, light source 14 projects into housing 12 intended to accommodate said light source.

Figure 4:
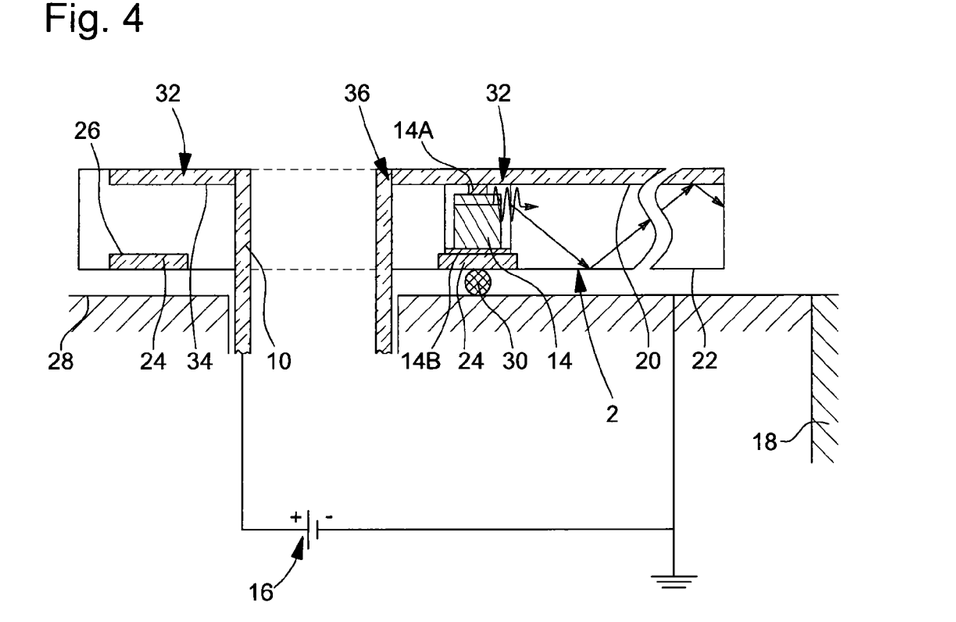
FIG. 4 is a similar view to that of FIG. 2, and shows the integration of the light source in the light guide.

FIG. 4 shows the integration of light source 14 in light guide 2. In FIG. 4, the second pole 14B of light source 14 is connected to frame 18 of the portable object and, consequently, to electrical energy supply source 16 via electrically conductive support piece 24. Purely by way of non-limiting illustration, the electrical connection between support piece 24 and an element of the portable object frame 18, such as a dial 28 above which the luminous display hand 1 moves, occurs by means of a friction part 30. This friction part 30 will preferably be positioned as close as possible to drive arbor 10, so as to minimise the effects of friction on the rotation of luminous display hand 1. First pole 14A of light source 14 is connected to energy supply source 16 via an electrically conductive external part 32, arranged on first surface portion 20 of light guide 2, and in electrical contact with drive arbor 10. External part 32 thus has an electrical connector function in addition to its decorative function. In fact, the presence of external part 32 gives light guide 2 the appearance of a conventional watch hand. To facilitate the securing, for example by adhesive bonding, of external part 32, a groove 34, in which external part 32 is housed, may be arranged in first surface portion 20. Consequently, external part 32 is in electrical contact, via an edge 36, with drive arbor 10. This drive arbor 10, made either of an electrically conductive material, or externally coated with an electrically conductive material, is then connected to energy supply source 16. According to a preferred but non-limiting variant, frame 18 is connected to ground and first pole 14A of light source 14 is connected to the positive pole of energy supply source 16.

Figure 5:
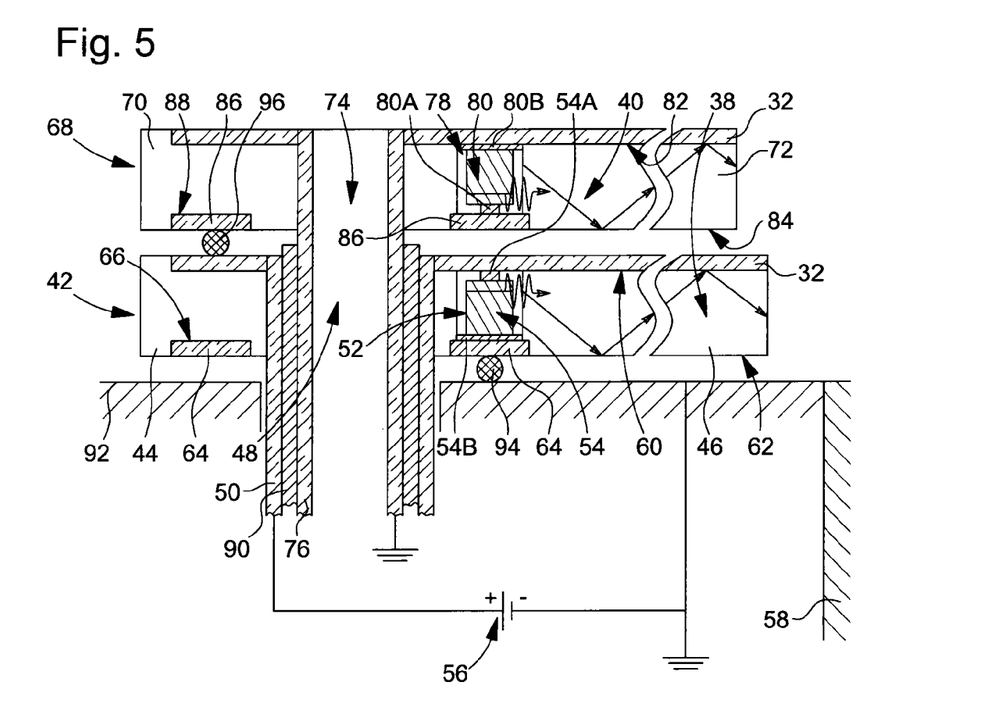
FIG. 5 is a longitudinal cross-section of a first embodiment of a set of luminous display hands according to the invention wherein the respective light sources are mounted in parallel.

FIG. 5 is a longitudinal cross-section of a first embodiment of a set of luminous display hands according to the invention wherein the respective light sources are mounted in parallel. In the example shown in FIG. 5, the set of hands includes a first and a second luminous display hand, respectively 38 and 40. It will be understood that these first and second luminous display hands 38 and 40 have a similar structure to that of luminous display hand 1 described above with reference to FIGS. 1 to 4.

The first luminous display hand 38 includes a light guide 42 formed of an annular element 44 extended by a substantially rectilinear portion 46. Annular element 44 has, at the centre thereof, a hole 48 for the passage of a drive arbor 50. A housing 52 intended to accommodate a first light source 54, such as a light emitting diode, is arranged in annular part 44 of light guide 42, in the area where rectilinear part 46 is connected to annular part 44. First light source 54 includes first and second poles 54A and 54B for electrical connection to an electrical energy supply source 56 housed inside a frame 58, for example of a wristwatch fitted with the set of luminous display hands according to the invention. It will be noted that the electrical energy supply source 56 concerned here is of the same type as the energy supply source 16 described above with reference to FIG. 4. Light guide 42 is provided with a first surface portion 60 facing an observer, and with a second surface portion 62 opposite first surface portion 60.

A ring-shaped electrically conductive support piece 64 carries the first light source 54. This support piece 64 is fixed in a circular groove 66 arranged in the base of annular element 44.

The second luminous display hand 40 includes a light guide 68 formed of an annular element 70 extended by a substantially rectilinear portion 72. Annular element 70 has, at the centre thereof, a hole 74 for the passage of a drive arbor 76. A housing 78 intended to accommodate a second light source 80, such as a light emitting diode, is arranged in annular part 70 of light guide 68, in the area where rectilinear portion 72 is connected to annular part 70. The second light source 80 includes first and second poles 80A and 80B for electrical connection to the electrical energy supply source 56 housed inside frame 58, for example of a wristwatch fitted with a set of luminous display hands according to the invention. It will be noted that the first and second light sources 54 and 80 are of the same type as light source 14 described above with reference to FIG. 4. Light guide 68 is provided with a first surface portion 82 facing an observer, and with a second surface portion 84 opposite first surface portion 82.

A ring-shaped electrically conductive support piece 86 carries the second light source 80. This support piece 86 is fixed in a circular groove 88 arranged in the base of annular element 70.

The drive arbor 76 of the second luminous display hand 40 is arranged concentrically inside the drive arbor 50 of the first luminous display hand 38, with the insertion of an insulating layer 90 between the two drive arbors 50 and 76.

First pole 54A of first light source 54 is connected to energy supply source 56 via the electrically conductive external part 32, arranged on first surface portion 60 of light guide 42, and in electrical contact with drive arbor 50 of first hand 38. The second pole 54B of first light source 54 is connected to energy supply source 56 via the frame 58 of the portable object. The second pole 54B of first light source 54 is connected to portable object frame 58 and, consequently, to electrical energy supply source 56 via electrically conductive support piece 64. Purely by way of non-limiting illustration, the electrical connection between support piece 64 and an element of the portable object frame 58, such as a dial 92 above which moves the luminous display hand 38 according to the invention, occurs by means of an electrically conductive friction part 94.

First pole 80A of the second light source 80 is connected to first pole 54A of first light source 54, and the second pole 80B of second light source 80 is connected to the portable object frame 58. More specifically, the first pole 80A of second light source 80 is connected to first pole 54A of first light source 54 by friction contact 96 between the first and second luminous display hands 38, 40. Second pole 80B of second light source 80 is connected to the portable object frame 58 via the electrically conductive external part 32, arranged on first surface portion 82 of light guide 68, and in electrical contact with drive arbor 76 of second luminous hand 40. By way of preferred but non-limiting example, frame 58 is connected to ground and first pole 54A of first light source 54 is connected to the positive terminal of energy supply source 56.

In the following description, any elements identical to those described with reference to FIG. 5 will be designated by the same reference numerals.

Figure 6:
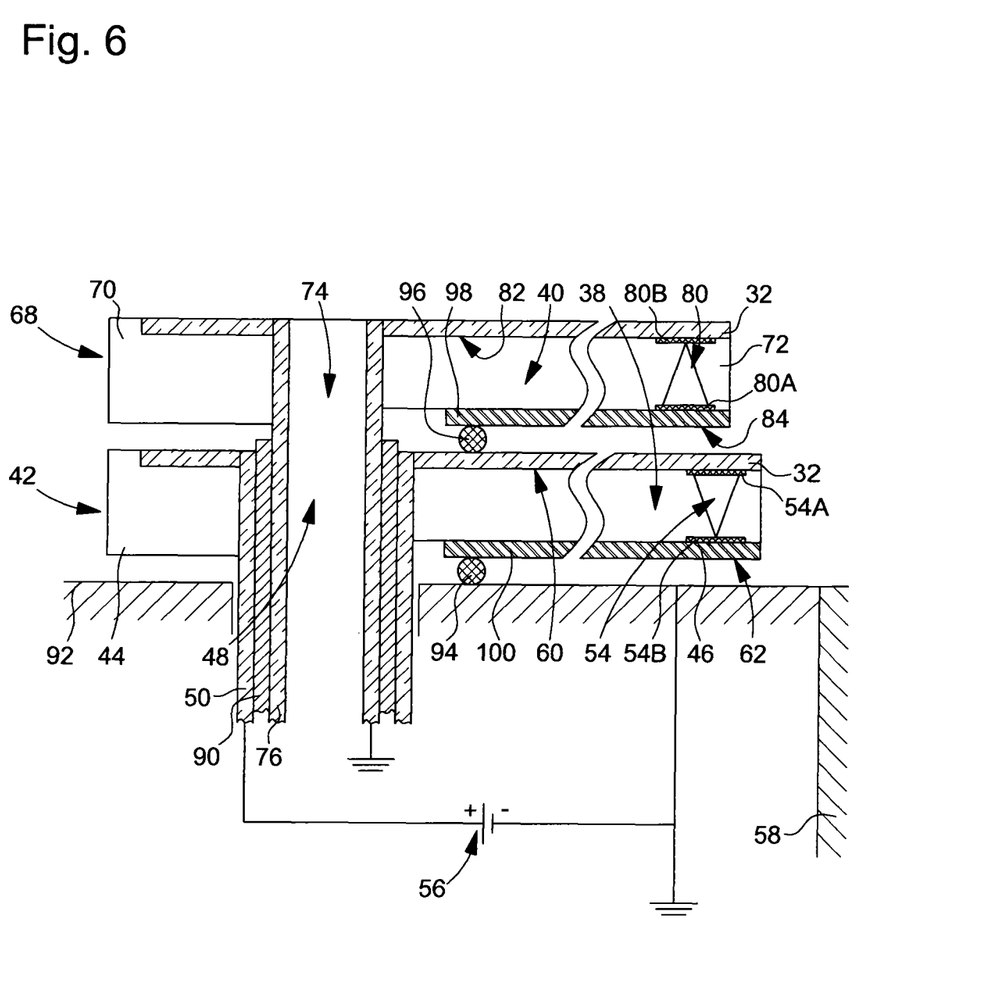
FIG. 6 is a schematic diagram of a variant embodiment of the set of luminous display hands according to the invention wherein the light sources are mounted in parallel at the tip of the hand.

FIG. 6 is a schematic diagram of a variant embodiment of the set of luminous display hands according to the invention wherein the light sources are mounted in parallel at the tip of the hand. In this embodiment, the first and second light sources 54 and 80 mounted in proximity to the free end of the first and second luminous display hands 38 and 40 are connected in parallel to the terminals of electrical energy supply source 56. By way of example, the second pole 80B of second light source 80 is connected to the portable object frame 58 via drive arbor 76 of second luminous display hand 40. The electrical connection between the second pole 80B of second light source 80 and drive arbor 76 is ensured by electrically conductive external part 32 arranged on first surface portion 82 of second luminous display hand 40. An electrically conductive path 98 is arranged on second surface portion 84 for electrical connection between first pole 80A of second light source 80 and first pole 54A of first light source 54 via electrically conductive friction part 96 and external part 32 arranged on first surface portion 60 of first luminous display hand 38. External part 32 is in electrical contact with drive arbor 50 of first hand 38. Conductive path 98 is, however, not in contact with drive arbor 76 of second luminous display hand 40. An electrically conductive path 100 is arranged on second surface portion 62 of first display hand 38 to ensure, via friction part 94, the electrical connection between second pole 54B of first light source 54 and an element of frame 58 of the portable object such as dial 92. Conductive path 100 is, however, not in contact with drive arbor 50 of first luminous display hand 38. By way of preferred but non-limiting example, frame 58 is connected to ground and drive arbor 50 of first luminous display hand 38 is connected to the positive terminal of energy supply source 56. It will also be noted that the electrical contact provided by friction part 96 can also be improved by the use of an electrically conductive lubricating agent such as graphite.

Figure 7:
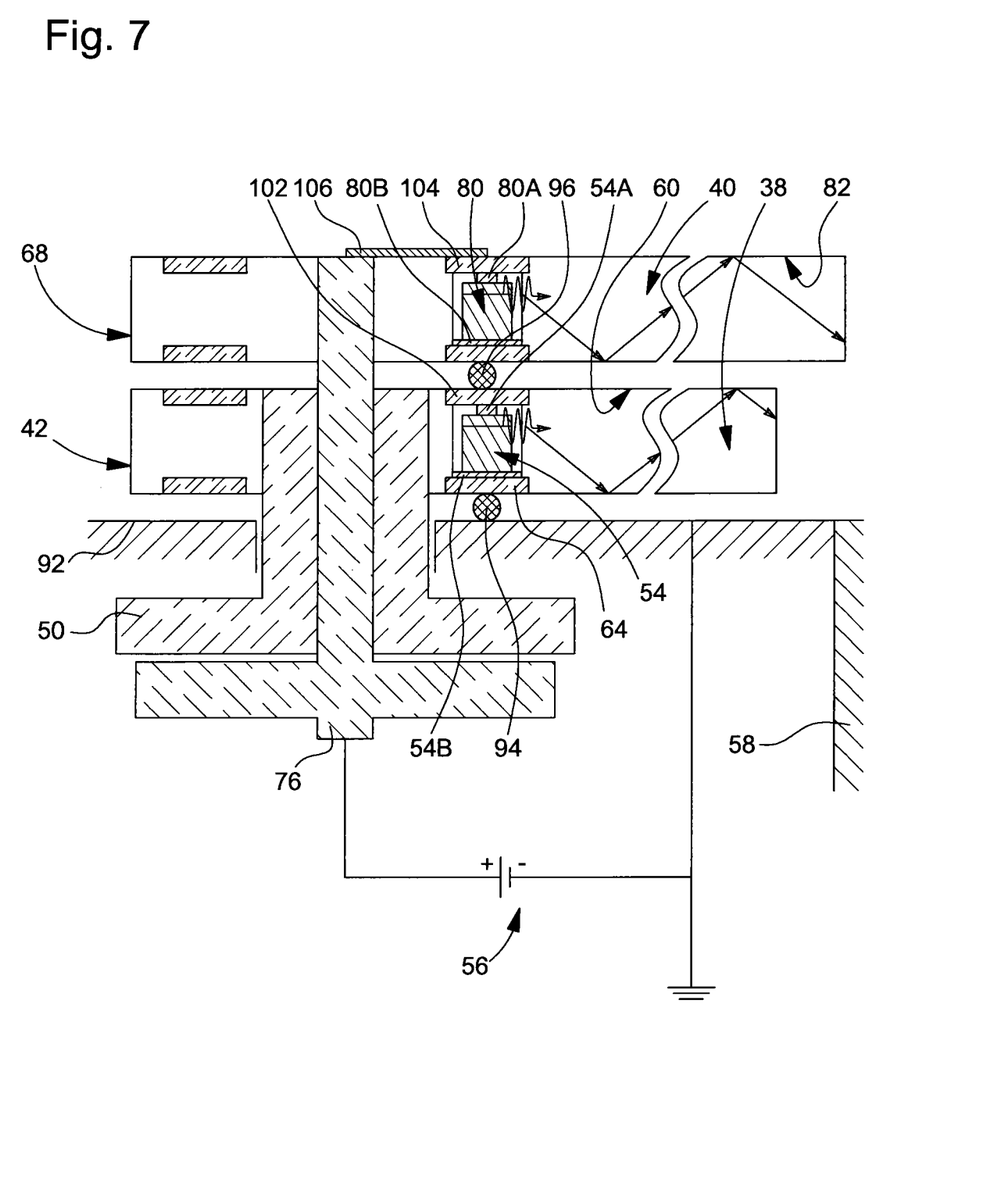
FIG. 7 is a longitudinal cross-section of a second embodiment of a set of luminous display hands according to the invention wherein the respective light sources are mounted in series.

FIG. 7 is a longitudinal cross-section of a second embodiment of a set of luminous display hands according to the invention wherein the respective light sources are mounted in series.

The second pole 54B of first light source 54 is connected to energy supply source 56 via the portable object frame 58. By way of example, the electrical connection between support piece 64 and an element of portable object frame 58, such as a dial 92 above which moves the luminous display hand 38 according to the invention, occurs by means of electrically conductive friction part 94. First pole 54A of first light source 54 is connected to second pole 80B of second light source 80 by friction contact 96 between the first and second luminous display hands 38 and 40. More specifically, first pole 54A of first light source 54 is in contact with a ring-shaped metallization 102 arranged in the first surface portion 60 of light guide 42 facing the observer. This metallization 102 is electrically connected to the second pole 80B of second light source 80 via electrically conductive friction part 96. First pole 80A of second light source 80 is connected to energy supply source 56 via drive arbor 76 of second luminous display hand 40. To this end, first pole 80A of second light source 80 is in contact with a ring-shaped metallization 104 arranged in first surface portion 82 of light guide 68 facing the observer. This metallization 104 is in turn connected to drive arbor 76, for example by means of an electrical connection wire 106. By way of preferred but non-limiting example, frame 58 is connected to ground and drive arbor 76 is connected to the positive terminal of energy supply source 56. It will be noted that, in this second embodiment, drive arbor 50 of first luminous display hand 38 plays no part in the electrical connection of first and second light sources 54 and 80. Consequently, drive arbor 50 can be made either of insulating or electrically conductive material. Further, it is not essential to insert an insulating layer between the two drive arbors 50 and 76. The only necessary precaution is to ensure that support piece 64 and metallization 102 are not in contact with drive arbor 50 if the latter is electrically conductive.

Figure 8:
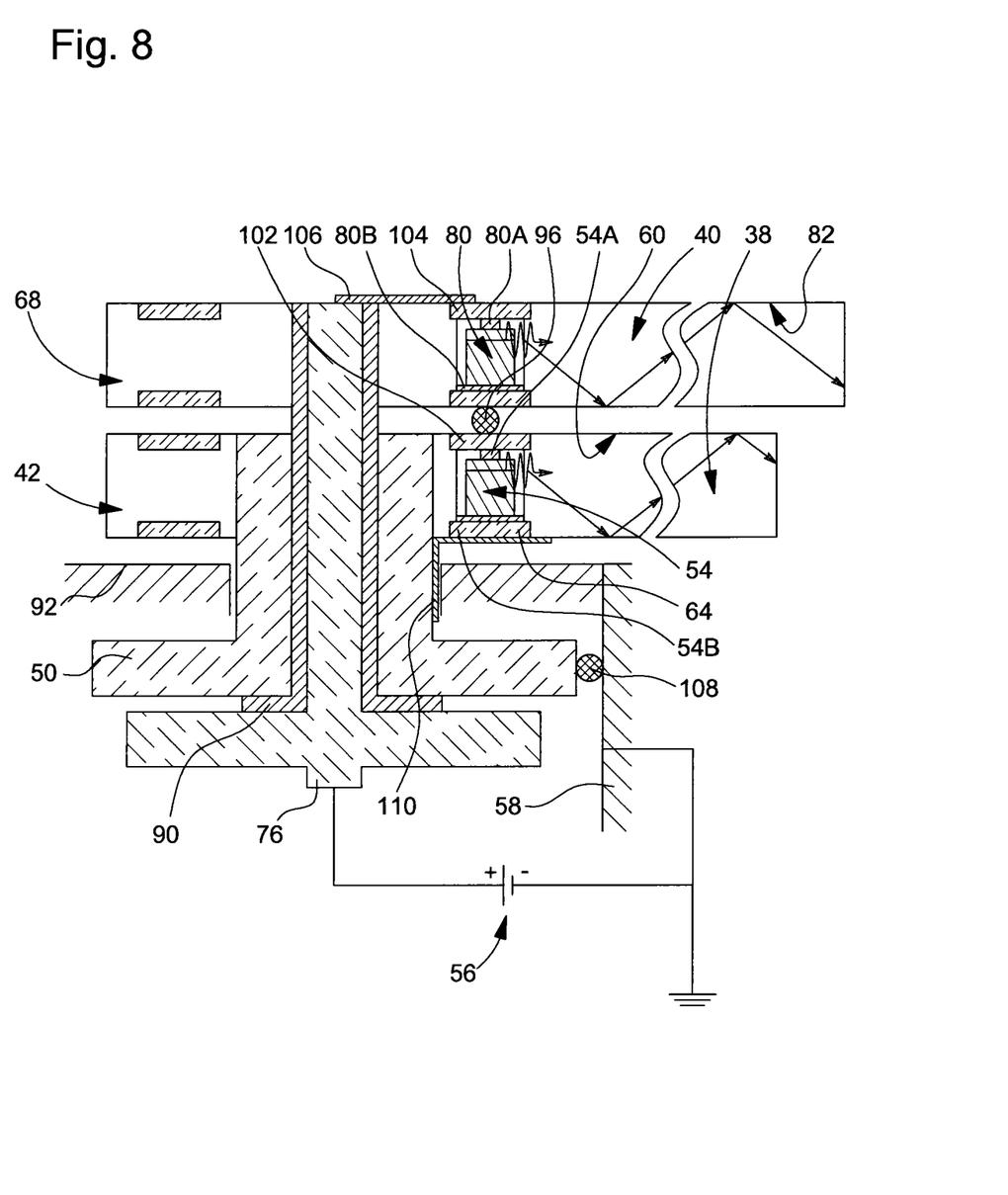
FIG. 8 is a longitudinal cross-section of a first variant embodiment of the set of luminous display hands wherein the respective light sources are mounted in series.

FIG. 8 is a longitudinal cross-section of a first variant embodiment of the set of luminous display hands wherein the respective light sources are mounted in series.

In this first variant embodiment, drive arbor 50 of first luminous display hand 38 is connected to energy supply source 56 via frame 58 of the portable object. By way of example, the electrical connection between drive arbor 50 and an element of the portable object frame 58 occurs by means of an electrically conductive friction part 108. The electrical connection between second pole 54B of first light source 54 and electrical energy supply source 56 occurs by means of a metallization 110 which electrically connects support piece 64 to drive arbor 50. The electrical connection between first pole 54A of first light source 54 and second pole 80B of second light source 80 and the electrical connection between first pole 80A of second light source 80 and drive arbor 76 of second luminous display hand 40 remain unchanged as regards the description given in FIG. 6. In particular, an insulating layer 90 is inserted between the two drive arbors 50 and 76.

Figure 9:
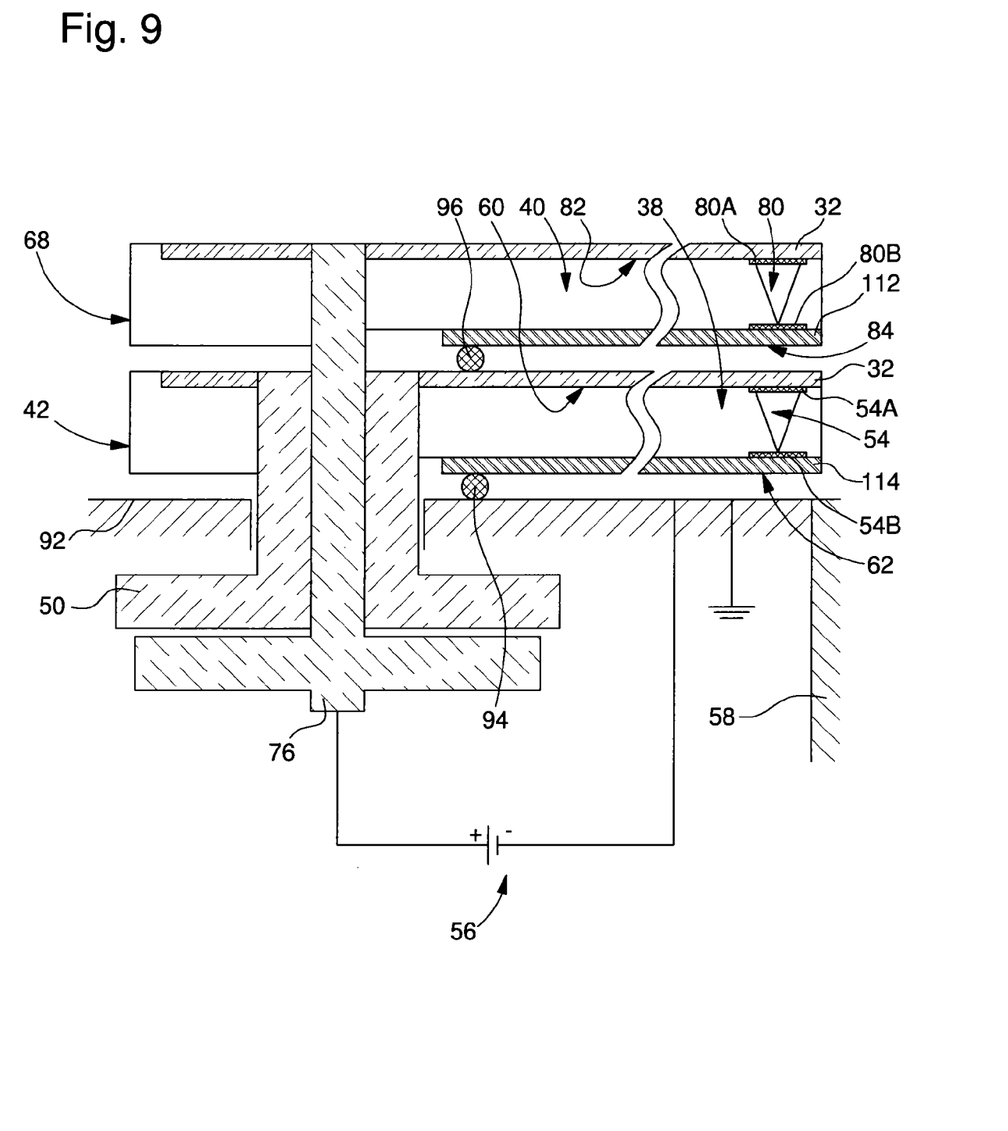
FIG. 9 is a schematic diagram of a second variant embodiment of the set of luminous display hands according to the invention wherein the light sources are mounted in series at the tip of the hand.

FIG. 9 is a schematic diagram of a second variant embodiment of the set of luminous display hands according to the invention wherein the light sources are mounted in series at the tip of the hand. In this second embodiment, the first and second light sources 54 and 80 mounted in proximity to the free end of the first and second luminous display hands 38 and 40, are mounted in series at the terminals of electrical energy supply source 56. By way of example, first pole 80A of second light source 80 is connected to the portable object frame 58 via drive arbor 76 of second luminous display hand 40. The electrical connection between first pole 80A of second light source 80 and drive arbor 76 is ensured by electrically conductive external part 32 arranged on the first surface portion 82 of second luminous display hand 40. An electrically conductive path 112 is arranged on second surface portion 84 for electrical connection between second pole 80B of second light source 80 and first pole 54A of first light source 54 via friction part 96 and external part 32 arranged on first surface portion 60 of first luminous display hand 38. An electrically conductive path 114 is arranged on second surface portion 62 of first display hand 38 to ensure, via friction part 94, the electrical connection between second pole 54B of first light source 54 and an element of frame 58 of the portable object such as dial 92.

Figure 10:
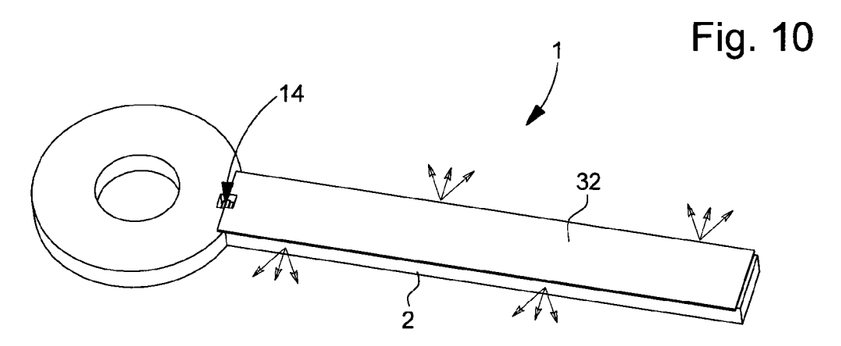
FIGS. 10 to 13 are top views of various embodiments of a luminous display hand according to the invention.

In a first embodiment of the hand (FIG. 10), the width of light guide 2 is equal to or less than the width of external part 32. During the day, display hand 1 thus has the appearance of an ordinary display hand. At night, when light source 14 is illuminated, the diffusing edges of light guide 2 generate light losses, so that the periphery of hand 1 is visible.

Figure 11:
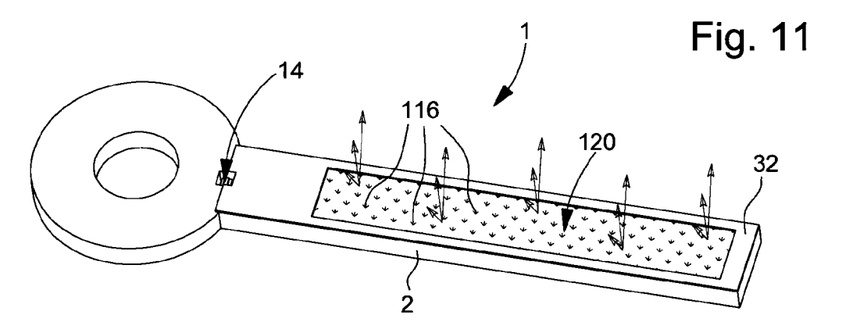

In a second embodiment of the hand (FIG. 11), an opening 120 in external part 32 reveals light guide 2 which is provided, in the visible portion thereof, with microstructures 116 which extract light and therefore illuminate the hand. According to a variant, light guide 2 is made of an intrinsically diffusing material which spontaneously produces optical losses throughout the volume of the material.

Figure 12:
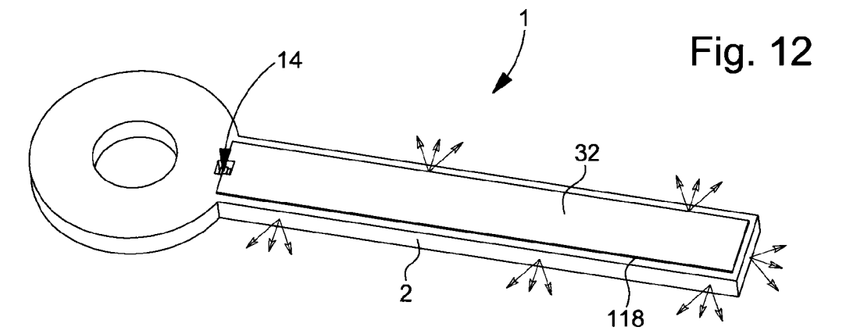

In a third embodiment of the hand (FIG. 12), external part 32 is narrower than light guide 2 and the edge of light guide 2 has a prismatic shape 118 which deviates light towards the user.

Figure 13:
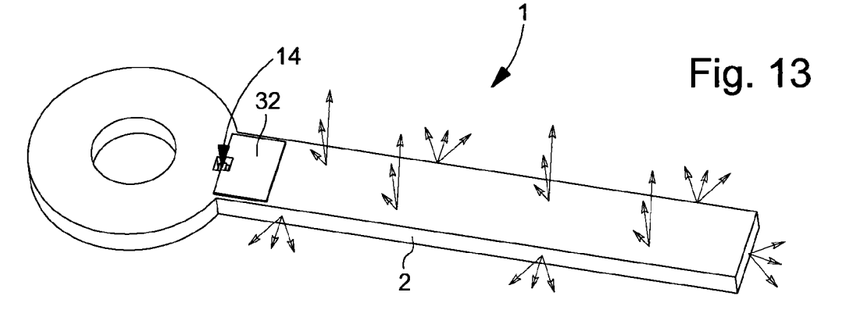

In a fourth embodiment of the hand (FIG. 13), external part 32 stops at annular part 4 of light guide 2 and similar light extraction techniques to those described above are used.

It goes without saying that this invention is not limited to the embodiments that have just been described and that various simple alterations and variants can be envisaged by those skilled in the art without departing from the scope of the invention as defined by the annexed claims. It will be noted, in particular, that the diameter of the hole 8 made in annular element 4 for the passage of drive arbor 10 has a slightly larger diameter than that of drive arbor 10. Indeed, in order for the luminous display hand according to the invention to be driven onto drive arbor 10, drive arbor 10 must have some elasticity, otherwise drive arbor 10 does not deform sufficiently when it is driven in and risks breaking. Likewise, it is clear that the dimensions of light source 14 must be such that once placed in its housing 12, light source 14 comes into electrical contact with external part 32. Further, it goes without saying that the smaller the dimensions of light source 14, the thinner the luminous display hand according to the invention can be. It will also be noted that, if the light sources are mounted at the tip of a hand, it is advantageously possible to use conventional, for example metal, hands. In such case, in fact, it is not necessary for the light to propagate in a light guide in order to illuminate the hand. The light sources, mounted on the upper surface at the tip of the hands can emit light towards the user. They may also be mounted at the end of the hands, so as to emit light in the extension of the hands, which makes it possible, for example, to illuminate a flange which surrounds the dial above which the luminous display hands of the invention move. The light sources may also be mounted on the rear face of the hands, so as to illuminate the dial. It is also possible to envisage that the light sources emit light in the opposite direction to the usual direction of rotation of the hands. Likewise, it is possible to envisage using light sources of different colours for each of the luminous display hands. It is even possible to envisage mounting, for example, two light sources of different colours on each of the hands. The light sources of a first colour will emit light in a first operating mode, for example in display adjustment mode, and the light sources of a second colour will emit light in the normal operating mode of the hands, for example in current time display mode.

LIST OF PARTS

Luminous display hand 1
Light guide 2
Annular element 4
Rectilinear portion 6
Hole 8
Drive arbor 10
Housing 12
Light source 14
First and second poles 14A, 14B
Power supply source 16
Frame 18
First surface portion 20
Second surface portion 22
Support piece 24
Circular groove 26
Dial 28
Friction part 30
External part 32
Groove 34
Edge 36
First luminous display hand 38
Second luminous display hand 40
Light guide 42
Annular element 44
Rectilinear portion 46
Hole 48
Drive arbor 50
Housing 52
First light source 54
First and second poles 54A, 54B
Power supply source 56
Frame 58
First surface portion 60
Second surface portion 62
Support piece 64
Circular groove 66
Light guide 68
Annular element 70
Rectilinear portion 72
Hole 74
Drive arbor 76
Housing 78
Second light source 80
First and second poles 80A, 80B
First surface portion 82
Second surface portion 84
Support piece 86
Circular groove 88
Insulating layer 90
Dial 92
Friction part 94
Friction contact 96
Electrically conductive path 98
Electrically conductive path 100
Metallization 102
Metallization 104
Electrical connection wire 106
Friction part 108
Metallization 110
Electrically conductive path 112
Electrically conductive path 114
Microstructures 116
Prismatic shape 118
Opening 120

What is claimed is:

1. A set of luminous display hands for a portable object, wherein the portable object includes a frame housing an electrical energy supply source including a first and a second terminal, the set of luminous display hands comprising:
   at least a first and a second luminous display hand made of an electrically non-conductive material and in which a hole is arranged for the passage of a drive arbor,
   wherein the drive arbor of the second luminous display hand is arranged concentrically inside the drive arbor of the first luminous display hand and an insulating layer is positioned between the drive arbor of the second luminous display hand and the drive arbor of the first luminous display hand,
   wherein the first luminous display hand carries a first light source, the second luminous display hand carries a second light source, and the first light source and the second light source emit light,
   wherein the first and second light sources each include a first and a second pole, and
   wherein, when the light sources are mounted in parallel, the first pole of the second light source is connected to the first pole of the first light source by electric contact between the first and second luminous hands.

2. The set of luminous display hands according to claim 1, wherein, when the light sources are mounted in parallel, the first pole of the second light source is connected to the first pole of the first light source by friction contact between the first and the second luminous hand.

3. The set of luminous display hands according to claim 2, wherein the first luminous display hand includes a light guide provided with an annular element in which is made the hole for the passage of the drive arbor of the first luminous display hand, wherein the second luminous display hand includes a light guide provided with an annular element in which is made the hole for the passage of the drive arbor of the second luminous display hand, wherein the contact between the first and the second luminous display hands occurs by friction between the annular elements.

4. The set of luminous display hands according to claim 1, wherein an electrically conductive support piece carrying the second light source is fixed in the base of the annular element of the second luminous display hand and is connected by a friction part to an electrically conductive external part in contact with the first pole of the first light source and arranged on a first surface portion of the first luminous display hand facing an observer.

5. The set of luminous display hands according to claim 1, wherein the second pole of the first light source is connected to the energy supply source via the frame of the portable object, wherein the first pole of the first light source is connected to the second pole of the second light source, and wherein the first pole of the second light source is connected to the energy supply source via the drive arbor of the second hand.

6. The set of luminous display hands according to claim 1, wherein at least one of light sources is mounted at the tip of the corresponding luminous display hand.

7. A set of luminous display hands for a portable object, wherein the portable object includes a frame housing an electrical energy supply source including a first and a second terminal, the set of luminous display hands comprising:
   at least a first and a second luminous display hand made of an electrically non-conductive material and in which a hole is arranged for the passage of a drive arbor,
   wherein the drive arbor of the second luminous display hand is arranged concentrically inside the drive arbor of the first luminous display hand and an insulating layer is positioned between the drive arbor of the second luminous display hand and the drive arbor of the first luminous display hand,
   wherein the first luminous display hand carries a first light source, the second luminous display hand carries a second light source, and the first light source and the second light source emit light,
   wherein the first and second light sources each include a first and a second pole, and
   wherein, when the light sources are mounted in series, the second pole of the second light source is connected to the first pole of the first light source by electric contact between the first and second luminous hands.

8. The set of luminous display hands according to claim 7, wherein, when the light sources are mounted in series, the second pole of the second light source is connected to the first pole of the first light source by friction contact between the first and the second luminous hand.

9. The set of luminous display hands according to claim 8, wherein the first luminous display hand includes a light guide provided with an annular element in which is made the hole for the passage of the drive arbor of the first luminous display hand, wherein the second luminous display hand includes a light guide provided with an annular element in which is made the hole for the passage of the drive arbor of the second luminous display hand, wherein the contact between the first and the second luminous display hands occurs by friction between the annular elements.

10. The set of luminous display hands according to claim 7, wherein an electrically conductive support piece carrying the second light source is fixed in the base of the annular element of the second luminous display hand and is connected by a friction part to an electrically conductive external part in contact with the first pole of the first light source and arranged on a first surface portion of the first luminous display hand facing an observer.

11. The set of luminous display hands according to claim 7, wherein the second pole of the first light source is connected to the energy supply source via the frame of the portable object, wherein the first pole of the first light source is connected to the second pole of the second light source, and wherein the first pole of the second light source is connected to the energy supply source via the drive arbor of the second hand.

12. The set of luminous display hands according to claim 7, wherein at least one of light sources is mounted at the tip of the corresponding luminous display hand.

13. A set of luminous display hands for a portable object, wherein the portable object includes a frame housing an electrical energy supply source including a first and a second terminal, the set of luminous display hands comprising:
   at least a first and a second luminous display hand made of an electrically non-conductive material and in which a hole is arranged for the passage of a drive arbor,
   wherein the drive arbor of the second luminous display hand is arranged concentrically inside the drive arbor of the first luminous display hand,
   wherein the first luminous display hand carries a first light source, the second luminous display hand carries a second light source, and the first light source and the second light source emit light,
   wherein the first and second light sources each include a first and a second pole,
   wherein, when the light sources are mounted in parallel, the first pole of the second light source is connected to the first pole of the first light source by electric contact between the first and second luminous hands,
   wherein an electrically conductive support piece carrying the second light source is fixed in the base of the annular element of the second luminous display hand and is connected by a friction part to an electrically conductive external part in contact with the first pole of the first light source and arranged on a first surface portion of the first luminous display hand facing an observer, and
   wherein the first pole of the first light source is connected to the energy supply source via the drive arbor of the first hand, wherein the second pole of the first light source is connected to the energy supply source via the frame of the portable object, wherein the first pole of the second light source is connected to the first pole of the first light source, and wherein the second pole of the second light source is connected to the frame of the portable object via the drive arbor of the second luminous hand, wherein an insulating layer is inserted between the two drive arbors.

14. The set of luminous display hands according to claim 13, wherein the second pole of the first light source is connected to the frame of the portable object and, consequently, to the electrical energy supply source via an electrically conductive support piece fixed to the base of an annular element via which the first luminous display hand is fixed to the drive arbor.

15. The set of luminous display hands according to claim 14, wherein the electrical connection between the support piece and a dial above which moves the first luminous display hand occurs via a friction part.

16. A set of luminous display hands for a portable object, wherein the portable object includes a frame housing an electrical energy supply source including a first and a second terminal, the set of luminous display hands comprising:
   at least a first and a second luminous display hand made of an electrically non-conductive material and in which a hole is arranged for the passage of a drive arbor,
   wherein the drive arbor of the second luminous display hand is arranged concentrically inside the drive arbor of the first luminous display hand,
   wherein the first luminous display hand carries a first light source, the second luminous display hand carries a second light source, and the first light source and the second light source emit light, wherein the first and second light sources each include a first and a second pole, wherein, when the light sources are mounted in series, the second pole of the second light source is connected to the first pole of the first light source by electric contact between the first and second luminous hands, wherein an electrically conductive support piece carrying the second light source is fixed in the base of the annular element of the second luminous display hand and is connected by a friction part to an electrically conductive external part in contact with the first pole of the first light source and arranged on a first surface portion of the first luminous display hand facing an observer, and wherein the first pole of the first light source is connected to the energy supply source via the drive arbor of the first hand, wherein the second pole of the first light source is connected to the energy supply source via the frame of the portable object, wherein the first pole of the second light source is connected to the first pole of the first light source, and wherein the second pole of the second light source is connected to the frame of the portable object via the drive arbor of the second luminous hand, wherein an insulating layer is inserted between the two drive arbors.

17. The set of luminous display hands according to claim 16, wherein the second pole of the first light source is connected to the frame of the portable object and, consequently, to the electrical energy supply source via an electrically conductive support piece fixed to the base of an annular element via which the first luminous display hand is fixed to the drive arbor.

18. The set of luminous display hands according to claim 17, wherein the electrical connection between the support piece and a dial above which moves the first luminous display hand occurs via a friction part.

\* \* \* \* \*